Figure 1:
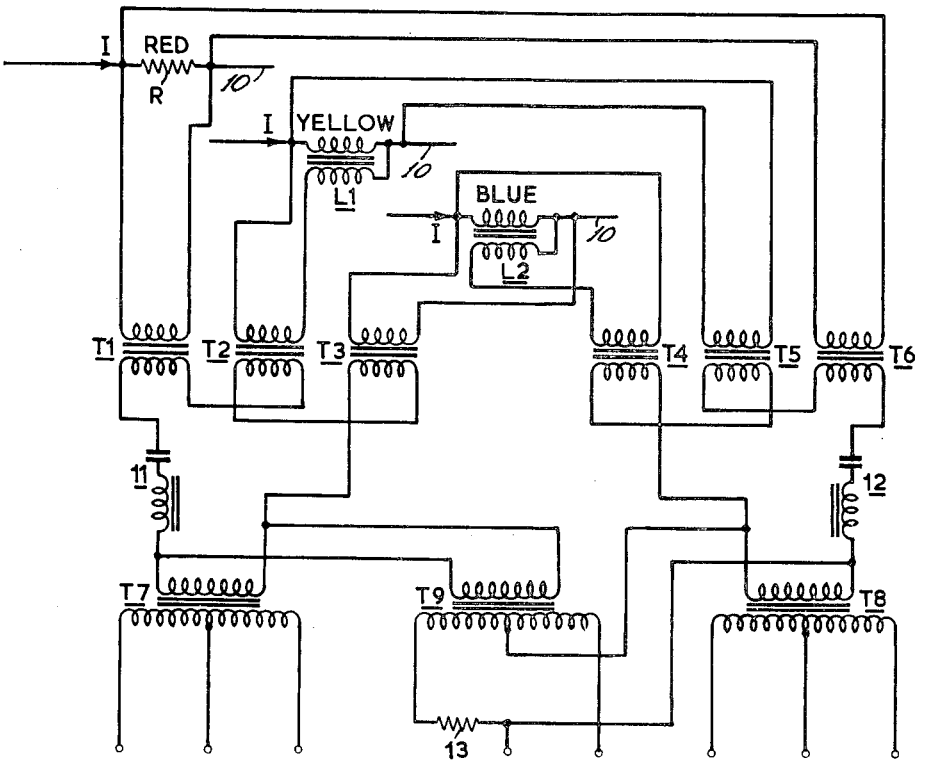

United States Patent Office 3,237,031
Patented Feb. 22, 1966

3,237,031
INDUCTIVE REACTANCE DEVICE FOR USE IN SYMMETRICAL COMPONENT ANALYSERS
Kenneth Thomas Yeates and Dennis Jones, Stafford, England, assignors to The English Electric Company Limited, London, England, a British company
Filed Sept. 19, 1962, Ser. No. 224,781
Claims priority, application Great Britain, Oct. 5, 1961, 35,876/61
7 Claims. (Cl. 307—149)

This invention relates to inductive reactance devices intended particularly, though not exclusively, for use in polyphase symmetrical component analysers.

For certain applications it is necessary to derive a first alternating electrical signal and a second such signal bearing a predetermined phase and amplitude relationship to said first signal. Where a said signal is required to lead a third such signal, the most convenient methods of deriving this leading signal have, in the past, usually entailed the use of a capacitative reactance. It is an object of the present invention to provide signals having the said phase relationship without the use of capacitors, and thereby to avoid the disadvantages connected therewith.

According to one feature of the invention, an inductive reactance device comprises a primary winding having a first and a second terminal and a secondary winding mutually inductively coupled with the primary winding and having a first terminal connected to the first terminal of the primary winding and a free second terminal, the ratio of the number of turns of the secondary winding to the number of turns of the primary winding and the self-inductance of the primary winding being such that, when an alternating current of predetermined frequency is passed through the primary winding, the voltages across the primary winding and between the said second terminals of the primary and secondary windings are of predetermined amplitude and phase relationship.

To prevent disturbance of these relationships at different currents due to saturation effects, the reactance device is preferably air cored.

For certain applications the self-inductance of the primary winding and the ratio of the turns of the windings is required to be such that the two output voltages from the device are of equal amplitude.

Inductive reactance devices as hereinbefore specified may with advantage be used in a polyphase symmetrical component analyser.

Thus, according to a second feature of the invention, a polyphase symmetrical component analyser includes in at least one of the phases an inductive reactance device according to said first feature of the invention, the self-inductance of the primary winding, the ratio of the turns of the primary and secondary windings and the inductive coupling between said windings being such that the two output voltages from the device are of equal amplitude and predetermined phase relationship.

Figure 2:
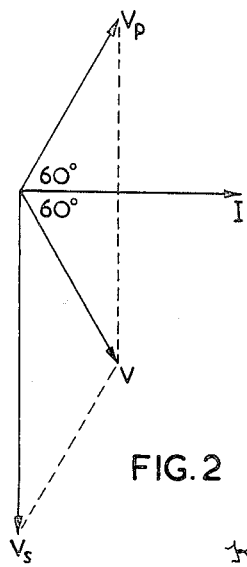

A three-phase symmetrical component analyser according to the invention will now be particularly described, by way of example, with reference to the accompanying drawings in which:

FIG. 1 is a circuit diagram of the analyser including two inductive reactance devices as hereinbefore specified, and FIG. 2 is a vector diagram showing the operation of a said reactance device.

FIG. 1 shows three lines 10 of a three phase transmission system. A non-inductive resistor R is connected in series with one line 10, that of the "red" phase, and two air cored inductive reactance devices L1 and L2 are respectively connected in series with the other two lines 10, those of the "yellow" and "blue" phases. FIG. 1 shows current I flowing from the three phase source (not shown) to the load (also not shown) on the transmission system.

Each of the inductive reactance devices L1, L2 has a primary winding connected in the line 10 and a secondary winding inductively coupled to its primary winding, one end of each of the windings being connected together. Each inductive reactance device has a first output representing the voltage across its primary winding and a second output representing the vector sum of the voltages across its primary and secondary windings. The output from the resistor R represents the voltage thereacross.

The outputs from the resistor R and the reactance devices L1, L2 are supplied to the primary windings of six transformers T1–T6, the output from the resistor R being supplied to the transformers T1 and T6 and the first and second outputs from the reactance device L1 and from the reactance device L2 being supplied respectively to the transformers T5, T2, T3 and T4.

The transformers T1, T2 and T3 each have a turns ratio of 6:1, the transformers T4, T5 and T6 a turns ratio of 1:1.

The circuit is arranged to produce three output signals representing respectively the positive sequence symmetrical components of the three phase current in the lines 10, the negative sequence symmetrical components of the three phase current in the lines 10, and a predetermined combination of the positive and negative sequence symmetrical components. As is well known, any unbalanced three phase system of voltages or currents can be represented by three sets of balanced, or symmetrical, components, one set of components comprising three vectors having positive phase sequence, one set of components comprising three vectors having negative phase sequence, and the third set of components comprising three vectors having zero phase sequence (or being in time-phase). The presence of faults on a system which cause the system to become unbalanced can thus be detected by detecting the presence of negative sequence components which arise when such faults occur and which do not exist when the system is balanced. Zero sequence components also arise under certain fault conditions but cannot arise in, for example, a star-connected system with no neutral connection.

The secondary windings of the transformers T1–T3 are interconnected in such a manner as to give the desired vectorial summation to produce an output signal representing the positive-sequence symmetrical components of the current in the line 10 and likewise the transformers T4–T6 are interconnected so as to give an output signal representing the negative-sequence symmetrical components of the current.

The so summated output from the secondary windings of the transformers T1–T3 are supplied, via a filter 11 consisting of a capacitor and an inductor, to the primary winding of a further transformer T7 having a turns ratio of 1:2 and a centre-tapped secondary winding supplying the positive-sequence symmetrical component output from the analyser. Likewise, the summated output from the transformers T4–T6 is supplied, via another filter 12 also consisting of a capacitor and an inductor, to the primary winding of a transformer T8 which also has a turns ratio of 1:2 and a centre-tapped secondary winding from which the negative-sequence symmetrical component output from the analyser is obtained.

The filters 11, 12 which are series tuned LC circuits are provided to achieve a high speed of operation without the risk of maloperation due to unwanted transients.

The third output from the analyser, representing the sum of predetermined portions of the positive-sequence and negative-sequence symmetrical component outputs, is obtained via a further transformer T9 also having a turns ratio of 1:2 and a centre-tapped secondary winding, whose primary winding is connected in parallel with that of the transformer T7 and whose secondary winding is connected with the primary winding of the transformer T8 in the form of a bridge network, a resistance 13 being included in this network for balancing the impedance of the circuit connected across its output terminals.

Thus the output from transformer T7, the positive-sequence symmetrical component output, will indicate the presence of a balanced three phase fault on the system when it rises above a predetermined minimum. The output from the transformer T8, the negative-sequence symmetrical component output will, when it is present, indicate the presence of an unbalanced three phase fault on the system. The combination of positive-sequence and negative-sequence symmetrical components in the output from transformer T9 may be used to initiate protective action once the increase of the output from transformer T7 or the presence of an output from transformer T8 has indicated the presence of a fault.

The reason for the difference in turns ratio between the transformers T1, T2, T3 on the one hand and the transformers T4, T5, T6 on the other hand is that the former transformers are used to supply the positive-sequence symmetrical component output and the latter transformers are used to supply the negative-sequence symmetrical component output and any fault detection apparatus receiving these two outputs must respond to a lower level of the negative-sequence symmetrical component output than of the positive-sequence symmetrical component output.

Referring now to FIG. 2, in which the vector I represents the current in the yellow or blue phase, the vectors $V_p$ and $V_s$ respectively the voltage across the primary winding of the inductive reactance device in that phase and the voltage induced in the secondary winding of the device, and V the vector sum of these voltages, it will be seen that, if the self-inductance of the primary winding is made such that the voltage $V_p$ across it leads the the current by 60° and the turns ratio is made equal to $\sqrt{3}$ or some greater value depending on the degree of mutual inductive coupling between the windings, then the vector sum V of the secondary voltage $V_s$ (which always lags the current I by 90°) and the primary voltage $V_p$ will be equal in amplitude to the primary voltage $V_p$ and will lag the latter by 120°.

In this manner there are obtained, in addition to voltage signals representing the current in the red phase, not only voltage signals representing the currents in the yellow and blue phase but also 120° phase shifted replicas of the last-mentioned two voltage signals.

These voltage signals are combined, in the transformers T1–T3 to produce the positive-sequence symmetrical components output in such a manner as to provide the vector sum of the voltage across the resistor R, the voltage across the primary winding of the reactance device in the blue phase (reversed) and the vector sum of the primary and secondary voltages of the reactance device in the yellow phase (reversed). It can be shown that this combination produces only the positive-sequence symmetrical components. The connections are such that the vectors of the negative-sequence and the zero-sequence symmetrical components sum to zero.

Likewise the transformers T4–T6 are so connected as to summate the voltage across the resistor R, the voltage across the primary winding of the reactance device in the yellow phase (reversed) and the vector sum of the voltages across the primary and secondary windings of the reactance device in the blue phase (reversed) to give the negative-sequence symmetrical component output.

It can be shown that this combination produces only the negative-sequence symmetrical components. The connections are such that the vectors of the positive-sequence and the zero-sequence symmetrical components sum to zero.

What we claim as our invention and desire to secure by Letters Patent is:

1. A polyphase symmetrical component analyser circuit arrangement for producing output signals characteristic of the symmetrical components of a polyphase system, including at least one inductive reactance device comprising a primary winding having first and second end terminals and a secondary winding mutually inductively coupled to the primary winding having first and second end terminals, means for passing a current from one of the phases of the polyphase system through the said primary winding, means interconnecting the first terminal of the primary winding with the first terminal of the secondary winding so that a first voltage signal is developed between the first and second terminals of the primary winding and a second voltage signal is developed between the second terminal of the primary winding and the second terminal of the secondary winding, the first and second voltage signals respectively leading and lagging the said current through the primary winding, first combining means connected to receive the said first voltage signal and signals derived from currents from other phases of the polyphase system so as to produce an output signal characteristic of the positive-sequence symmetrical components of the polyphase system, and second combining means connected to receive the said second voltage signal and signals derived from currents from other phases of the polyphase system so as to produce an output signal characteristic of the negative-sequence components of the polyphase system.

2. A polyphase symmetrical component analyser circuit arrangement according to claim 1, in which the inductive reactance device is air-cored.

3. A three-phase symmetrical component analyser circuit arrangement for producing output signals characteristic of symmetrical components of a three phase system, including a first inductive reactance device comprising a primary winding having first and second end terminals and a secondary winding mutually inductively coupled to the primary winding having first and second end terminals, means for passing a current from a first one of the three phases through the primary winding, means interconnecting the first terminal of the primary winding with the first terminal of the secondary winding so that a first voltage signal is developed between the first and second terminals of the primary winding and a second voltage signal is developed between the second terminal of the primary winding and the second terminal of the secondary winding, the first and second voltage signals respectively leading and lagging on the said current through the primary winding, a second inductive reactance device comprising a primary winding having first and second end terminals and a secondary winding mutually inductively coupled to the primary winding having first and second end terminals, means for passing a current from a second one of the three phases through the primary winding of the second inductive reactance device, means interconnecting the first terminal of the primary winding of the second inductive reactance device with the first terminal of its secondary winding so that a third voltage signal is developed between the first and second terminals of the primary winding of the second inductive reactance device and a fourth voltage signal is developed between the second terminal of that primary winding and the second terminal of the secondary winding of the second inductive reactance device, the third and fourth voltage signals respectively leading and lagging on the said current through the primary winding of the second inductive reactance device, a non-inductive resistance element, means for passing a current from the third one of the three phases through the resistance element so as to develop thereacross a fifth voltage signal, first combining means connected to receive the second, third and fifth voltage signals so as to produce a first output signal characteristic of the positive-sequence symmetrical components of the three phase system, and second combining means connected to receive the first, fourth and fifth voltage signals so as to produce a second output signal characteristic of the negative-sequence symmetrical components of the three phase system.

4. A three phase symmetrical component analyser circuit arrangement according to claim 3, in which each inductive reactance device is air-cored.

5. A three phase symmetrical component analyser circuit arrangement according to claim 4, in which the self-inductance of the primary windings of the inductive reactance devices and the ratio of the number of turns in each primary winding to the number of turns in the corresponding secondary winding are such that the first and second voltage signals have equal amplitude and lead and lag, respectively, on the current through the primary winding of the first inductive reactance device by 60°, and the third and fourth voltage signals have equal amplitude and lead and lag, respectively, on the current through the primary winding of the second inductive reactance device by 60°.

6. A three phase symmetrical component analyser circuit arrangement according to claim 5, in which the first combining means comprises three transformers each having a primary winding and a secondary winding, their primary windings being connected to receive the said second, third and fifth voltage signals respectively and their secondary windings being connected in series, the secondary windings of the transformers which receive the second and third voltage signals being reversed and the first output signal being produced by the current flowing in the series-connected secondary windings, and in which the second combining means comprises three further transformers each having a primary winding and a secondary winding, the primary windings of these further transformers being connected to receive the said first, fourth and fifth voltage signals respectively and the secondary winding of these further transformers being connected in series, the secondary windings of the further transformers which receive the first and fourth voltage signals being reversed and the second output signal being produced by the current flowing in the series-connected secondary windings of these further transformers.

7. A three phase symmetrical component analyser circuit arrangement according to claim 6, including a series-tuned inductance-capacitance filter circuit connected in series with the series-connected secondary windings of the transformers of the first combining means and a similar filter circuit connected in series with the series-connected secondary windings of the transformers of the second combining means.

References Cited by the Examiner
UNITED STATES PATENTS

| | | | |
|---|---|---|---|
| 2,753,512 | 7/1956 | Helterline et al. | 323—45 |
| 2,758,219 | 8/1956 | Miller | 307—17 |
| 2,791,726 | 5/1957 | Feinberg | 323—45 |

LLOYD McCOLLUM, *Primary Examiner.*